(12) United States Patent
Chen et al.

(10) Patent No.: US 11,140,197 B2
(45) Date of Patent: Oct. 5, 2021

(54) METHOD AND APPARATUS FOR DDOS ATTACK DETECTION

(71) Applicants: NSFOCUS INFORMATION TECHNOLOGY CO., LTD., Beijing (CN); NSFOCUS TECHNOLOGIES INC., Beijing (CN)

(72) Inventors: Hanbing Chen, Beijing (CN); Bin Zheng, Beijing (CN); Kun He, Beijing (CN)

(73) Assignee: NSFOCUS INFORMATION TECHNOLOGY CO., LTD., Beijing (CN)

(*) Notice: Subject to any disclaimer, the term of this patent is extended or adjusted under 35 U.S.C. 154(b) by 435 days.

(21) Appl. No.: 15/439,901

(22) Filed: Feb. 22, 2017

(65) Prior Publication Data

US 2017/0163680 A1 Jun. 8, 2017

Related U.S. Application Data

(63) Continuation of application No. PCT/CN2015/089334, filed on Sep. 10, 2015.

(30) Foreign Application Priority Data

Sep. 12, 2014 (CN) .......................... 201410465475.8

(51) Int. Cl.
*H04L 29/06* (2006.01)
(52) U.S. Cl.
CPC ...... *H04L 63/1458* (2013.01); *H04L 63/1425* (2013.01)
(58) Field of Classification Search
CPC .................. H04L 63/1458; H04L 63/1425
See application file for complete search history.

(56) References Cited

U.S. PATENT DOCUMENTS

| 2003/0149648 | A1 | 8/2003 | Olsen et al. ..................... 705/35 |
| 2004/0215976 | A1* | 10/2004 | Jain ..................... H04L 63/1458 726/23 |
| 2014/0298098 | A1* | 10/2014 | Poghosyan ........ G06K 9/00536 714/37 |

FOREIGN PATENT DOCUMENTS

| CN | 101355463 A | 1/2009 |
| CN | 101534305 A | 9/2009 |

(Continued)

OTHER PUBLICATIONS

Stapel, Elizabeth, "Box-and-Whisker Plots: Interquartile Ranges and Outliers", Purplemath, Feb. 25, 2012, pp. 1-3, obtained from https://web.archive.org/web/20120226010508/https://www.purplemath.com/modules/boxwhisk3.htm (Year: 2012).*

(Continued)

*Primary Examiner* — Jeffrey D. Popham
(74) *Attorney, Agent, or Firm* — J.C. Patents

(57) ABSTRACT

Provided are a DDoS attack detection method and apparatus. The method comprises: acquiring network traffic of a target moment within a first period by sampling, then querying a traffic period change curve acquired in advance, determining predicted traffic corresponding to the target moment, and confirming a DDoS attack if the network traffic acquired by sampling is larger than the determined predicted traffic. The traffic period change curve is used for indicating a period change law of the predicted traffic, so that before DDoS attack detection is performed at each target moment, it only needs to determine the predicted traffic corresponding to the target moment according to the traffic period change curve without calculating the predicted traffic according to massive historical traffic data before each DDoS attack detection; and the calculation volume is reduced.

4 Claims, 2 Drawing Sheets

(56) References Cited

FOREIGN PATENT DOCUMENTS

| | | | |
|---|---|---|---|
| CN | 101729389 | A | 6/2010 |
| CN | 102111307 | A | 6/2011 |
| CN | 102118272 | A | 7/2011 |
| CN | 103546319 | A | 1/2014 |
| CN | 103973663 | A | 8/2014 |
| CN | 104202329 | A | 12/2014 |
| JP | 2008-311720 | A | 12/2008 |

OTHER PUBLICATIONS

The Japanese First Examination Report of corresponding Japan patent application No. 2017-513493, dated Mar. 27, 2018.
International Search Report of corresponding International PCT Application No. PCT/CN2015/089334, dated Nov. 3, 2015.
Chinese First Examination Report of corresponding China patent Application No. 201410465475.8, dated Jan. 4, 2017.

* cited by examiner

METHOD AND APPARATUS FOR DDOS ATTACK DETECTION

CROSS-REFERENCE TO RELATED APPLICATIONS

This application is a continuation of International Application No. PCT/CN2015/089334, filed on Sep. 10, 2015, which claims priority to Chinese Patent Application No. 201410465475.8, filed on Sep. 12, 2014. The disclosures of the aforementioned applications are hereby incorporated by reference in their entireties.

TECHNICAL FIELD

The present disclosure relates to network security technologies and, more particularly, to a method and an apparatus for DDoS attack detection.

BACKGROUND

Distributed denial of service (DDoS) attack means preventing legitimate users from getting any service response from a server by uniting multiple computers into an attacking platform that engages, under color of legitimate service requests, massive amount of service resources on one or more target servers.

When defending against DDoS attacks, a bypass network monitoring device is usually involved to detect DDoS attacks by examining current network traffic. In particular, the bypass network monitoring device samples the network traffic, compares the sampling result against a current threshold, and determines that a DDoS attack has been detected if the result is above predicted traffic corresponding to the current moment.

In prior art, the predicted traffic corresponding to the current moment is obtained prior to the detecting the DDoS attack by applying an interval estimation algorithm or a cumulative variable algorithm to a historical network traffic obtained from a number of most recent samplings. Hence, prior art requires that the predicted traffic at the current moment be calculated each time a DDoS attack detection is to be performed, which involves extended pre-stored historical traffic data and demands heavy amount of calculations.

SUMMARY

The present disclosure provides a method and an apparatus for DDoS attack detection in order to solve the technical problem where a heavy amount of computation is needed in calculating the predicted traffic at the current moment prior each time a DDoS attack detection is to be carried out.

A first aspect of the present disclosure provides a method for DDoS attack detection, including:

obtaining network traffic at a target moment within a first period by sampling;

querying a pre-acquired traffic cyclic variation curve to determine predicted traffic at the target moment, the traffic cyclic variation curve being used to indicate a cyclic change pattern of the predicted traffic; and if the network traffic obtained by sampling is greater than the determined predicted traffic, the DDoS attack is detected.

Another aspect of the present disclosure provides an apparatus for DDoS attack detection, including:

a sampling unit, configured to obtain network traffic at a target moment within a first period by sampling;

a determining unit, configured to query a pre-acquired traffic cyclic variation curve to determine predicted traffic at the target moment, the traffic cyclic variation curve being used to indicate a cyclic change pattern of the predicted traffic; and a detecting unit, configured to detect the DDoS attack if the network traffic obtained by sampling is greater than the determined predicted traffic.

According to the method and apparatus for DDoS attack detection provided in the present disclosure, network traffic at a target moment within a first period is obtained by sampling, before predicted traffic at the target moment is determined by querying a pre-acquired traffic cyclic variation curve. If the network traffic thus sampled is greater than the predicted traffic thus determined, a DDoS attack is detected. Since the traffic cyclic variation curve is used to indicate the cyclic change pattern of the predicted traffic, the predicted traffic corresponding to the target moment can be determined, before performing the DDoS attack detection at each target moment, by merely leveraging the traffic cyclic variation curve, rather than by calculating according to a huge amount of historical traffic data, thereby decreasing the amount of calculation involved. Since the DDoS attack detection relies on the cyclic change pattern of the traffics, ongoing DDoS attacks can be correctly recognized based on that pattern when a sudden traffic increase occurs, thereby reducing false alarms.

DETAILED DESCRIPTION

Figure 1:
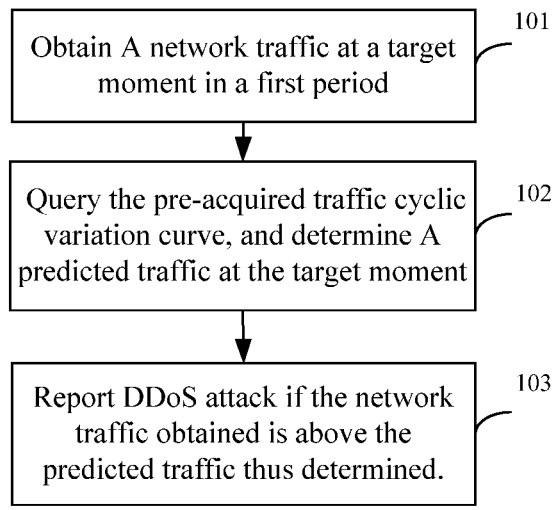
FIG. 1 is a flowchart illustrating a method for DDoS attack detection according to an embodiment of the present disclosure.

FIG. 1 is a flowchart illustrating a method for DDoS attack detection according to an embodiment of the present disclosure. The method provided by this embodiment may be performed by a bypass network monitoring device, which, as shown in FIG. 1, includes:

101: obtain network traffic at a target moment within a first period by sampling; and

102: query a pre-acquired traffic cyclic variation curve to determine predicted traffic at the target moment.

In this case, the traffic cyclic variation curve is intended to indicate the cyclic change pattern of the predicted traffic, and in particular, a mapping between individual moments in at least one period and the predicted traffic, i.e., the predicted traffic at each moment within at least one period.

Optionally, it is determined whether a traffic cyclic variation curve has been obtained after the network traffic at the target moment within the first period has been sampled, and if the traffic cyclic variation curve has been obtained, the predicted traffic corresponding to the target moment is determined according to the curve. If otherwise, the network traffic Si at n moments within a second period prior to the first period is obtained, where i=1, 2, . . . , n, and n is a natural number. Then, a calculation is performed according to the formula $TE_i=\alpha S_{i-1}+(1-\alpha)TE_{i-1}$, so as to obtain the traffic cyclic variation curve $\{TE_i|i=1, 2, \ldots, n\}$, where, $\alpha$ is a predefined damping coefficient for smoothing in the range of $0<\alpha<1$, typically in the range of 0.2 to 0.4, and $TE_i$ is the predicted traffic at an i-th moment within the first period. Thus the pre-acquired traffic cyclic variation curve is queried, and the predicted traffic at the target moment $t_{cur}$ is determined to be $TE_{cur}$, where $$cur = \left[\frac{t_{cur}\%(G \times n)}{G}\right].$$

It has been verified that there is no DDoS attack in the second period.

That is, the method provided by the present embodiment can obtain the traffic cyclic variation curve by performing calculation for the network traffic obtained in merely one period, and the next DDoS attack detection can be accomplished by leveraging the already obtained traffic cyclic variation curve instead of having to calculate the traffic cyclic variation curve again, thus reducing the amount of calculation required while avoiding consumption of system resource. Using the obtained traffic cyclic variation curve to detect DDoS can also determine whether a sudden increase in traffic is attributable to normal traffic, thereby reducing false alarms.

It should be noted that the obtaining network traffic Si at n moments within the second period can be accomplished by sampling the traffics Si at n evenly or unevenly spaced moments, which will not be limited herein.

It should also be noted that the obtained traffic cyclic variation curve $\{TE_i|i=1, 2, \ldots, n\}$ is a set of discrete points for the present embodiment, and a continuous traffic cyclic variation curve may be further obtain by referring to any of the prior art curve fitting algorithms.

S103: if the network traffic obtained by sampling is greater than the determined predicted traffic, the DDoS attack is detected.

In particular, it is determined whether the network traffic obtained by sampling is greater than the determined predicted traffic, and if the network traffic obtained by sampling is greater than the determined predicted traffic, DDoS attack is detected; otherwise, the network traffic is determined to be normal.

In the present embodiment, network traffic at a target moment within a first period is obtained by sampling, before predicted traffic at the target moment is determined by querying a pre-acquired traffic cyclic variation curve. If the network traffic thus sampled is greater than the predicted traffic thus determined, a DDoS attack is detected. Since the traffic cyclic variation curve is used to indicate the cyclic change pattern of the predicted traffic, the predicted traffic corresponding to the target moment can be determined, before performing the DDoS attack detection at each target moment, by merely leveraging the traffic cyclic variation curve, rather than by calculating according to a huge amount of historical traffic data, thereby decreasing the amount of calculation involved. Moreover, leveraging the obtained traffic cyclic variation curve to detect DDoS can also determine whether a sudden increase in traffic is attributable to normal traffic, thereby reducing false alarms.

Figure 2:
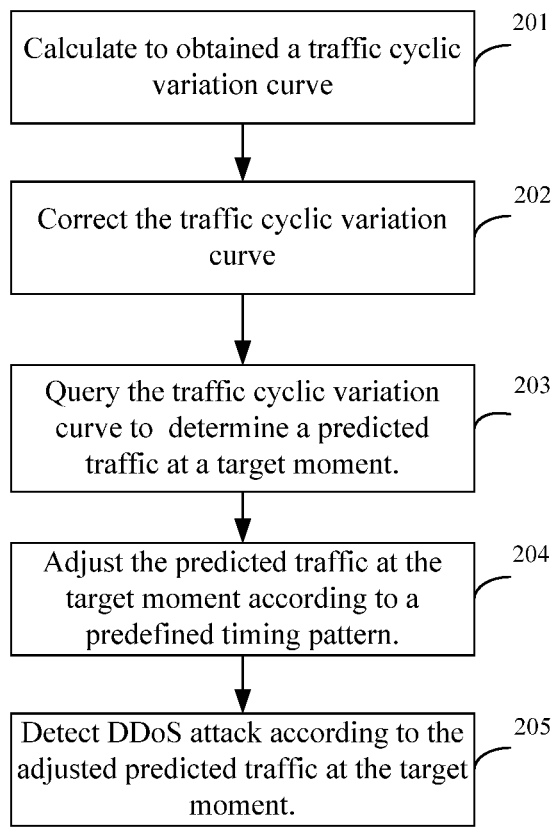
FIG. 2 is a flowchart illustrating a method for DDoS attack detection according to another embodiment of the present disclosure.

FIG. 2 is another flowchart illustrating the method for DDoS attack detection according to an embodiment of the present disclosure, as shown in FIG. 2, the method includes:

201, performing a calculation to obtain a traffic cyclic variation curve.

Optionally, data packets are received, with their contents analyzed, and saved in a database. Then, network traffic at every moment within the second period are extracted from the database, where one period is one day or one week, and the moments within the second period are spaced by a duration G. The extracted network traffic is denoted as Si, where i=1, 2, . . . n, n being a natural number that equals to the number of extracted network traffic. A calculation is performed according to equation $TE_i=\alpha S_{i-1}+(1-\alpha)TE_{i-1}$ to obtain the traffic cyclic variation curve $\{TE_i|i=1, 2, \ldots, n\}$, wherein $\alpha$ is a predefined damping coefficient for smoothing in a range of $0<\alpha<1$, and $TE_i$ is the predicted traffic at an i-th moment.

202: correct the traffic cyclic variation curve.

In particular, a calculation is performed according to equation $D_i=|\{S_i-TE_i\}|$ to obtain a residual error $D_i$ at the i-th moment; and the traffic cyclic variation curve is corrected according to equation $TH_i=TE_i+MAX(D_i)$ to obtain a corrected traffic cyclic variation curve $\{TH_i|i=1, 2, \ldots, n\}$, where $TH_i$ is a corrected predicted traffic at the i-th moment.

It should be understood that, potential error of sudden increase in the network traffic Si at the n moments within the second period is tested after the residual error $D_i$ at the i-th moment is obtained. That is, after performing the calculation according to the equation $D_i|\{S_i-TE_i\}|$ and obtaining the residual error $D_i$ at the i-th moment, wild points, if any, are removed from the residual errors $D_i$ according to the following procedure:

Firstly, a median $D_{med}=(D_{max}-D_{min})/2$ is determined, where $D_{max}$ represents the maximum residual error calculated, and $D_{min}$ represents the minimum residual error calculated.

Then, sequentially find out: the lower quartile $D_1=(D_{med}-D_{min})/2$;

the upper quartile $D_2=(D_{max}-D_{med})/2$; and the IQR $\Delta Q=D_2-D_1$.

Finally, a range $[D_1-1.5\Delta Q, D_2+1.5\Delta Q]$ is established, and a residual error $D_i$ is a valid value that shall be kept if it falls within the range, or an invalid or "wild" value that shall be removed if it falls outside of the range.

203: query the traffic cyclic variation curve to determine predicted traffic at a target moment.

In particular, predicted traffic at a target moment $t_{cur}$ is determined to be $TH_{cur}$, where $$cur = \left[\frac{t_{cur}\%(G \times n)}{G}\right].$$

204: adjust the predicted traffic at the target moment according to a predefined timing rule.

In particular, in order to deal with a condition in which network traffic expectedly witnesses a sudden increase at special moments on special days in a period, such as a year. That is, when such a condition occurs, the cycling pattern of network traffic is disrupted. When considering different servers providing different services, the magnitude and time section by which the network traffic changes can also differ. However, such an increase in network traffic is expected, rather than the result of DDoS attacks. In order to account for such conditions, a dynamic adjusting mechanism is provided. That is, the determined predicted traffic can be raised if the first period is a traffic increasing period indicated by a predefined timing rule, and/or the target moment is a traffic increasing moment indicated by the timing rule; and/or the determined predicted traffic can be lowered if the first period is a traffic decreasing period indicated by a predefined timing rule, and/or the target moment is a traffic decreasing moment indicated by the timing rule. Since the predicted traffic is adjusted based on the special timing rule, the cyclic change pattern of the predicted traffic is further improved in terms of accuracy, and the workload for operation and maintenance personnel can be reduced.

205: detect a DDoS attack according to the adjusted predicted traffic at the target moment.

In particular, it is determined whether the network traffic obtained by sampling is greater than the determined predicted traffic, and if the network traffic obtained by sampling is greater than the determined predicted traffic, DDoS attack is detected. Otherwise, the network traffic is determined to be normal.

It should be noted that the steps 203 to 205 may be repeated at predefined durations, e.g. the aforementioned duration G.

In this embodiment, network traffic at a target moment within a first period is obtained by sampling, before predicted traffic at the target moment is determined by querying a pre-acquired traffic cyclic variation curve. If the network traffic thus sampled is greater than the predicted traffic thus determined, a DDoS attack is detected. Since the traffic cyclic variation curve is used to indicate the cyclic change pattern of the predicted traffic, the predicted traffic corresponding to the target moment can be determined, before performing the DDoS attack detection at each target moment, by merely leveraging the traffic cyclic variation curve, rather than by calculating according to a huge amount of historical traffic data, thereby decreasing the amount of calculation involved. Moreover, leveraging historical traffic trends to detect DDoS also helps effectively finding out whether a sudden increase in traffic is attributable to expected traffics or DDoS attacks. Moreover, since the predicted traffic is adjusted based on the special timing rule, the cyclic change pattern of the predicted traffic can be further improved in terms of accuracy.

Figure 3:
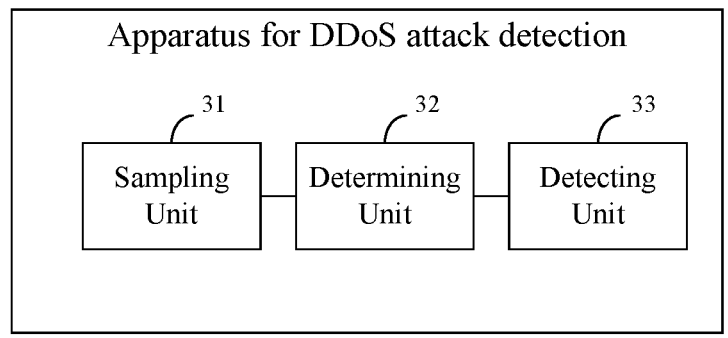
FIG. 3 is a schematic structural diagram illustrating an apparatus for DDoS attack detection according to an embodiment of the present disclosure.

FIG. 3 is a schematic structural diagram illustrating an apparatus for DDoS attack detection according to an embodiment of the present disclosure. The apparatus provided in the present embodiment may be arranged in a bypass network monitoring device, and may include, as shown in FIG. 3, a sampling unit 31, a determining unit 32, and a detecting unit 33.

The sampling unit 31 is configured to obtain network traffic at a target moment in a first period by sampling.

The determining unit 32 is coupled to the sampling unit 31, and is configured to query a pre-acquired traffic cyclic variation curve to determine predicted traffic at the target moment.

In this case, the traffic cyclic variation curve is intended to indicate the cyclic change pattern of the predicted traffic, and in particular, a mapping between individual moments in at least one period and the predicted traffic, i.e., the predicted traffic at each moment within at least one period.

Optionally, after the sampling unit 31 samples the network traffic at the target moment within the first period, the determining unit 32 will determine whether a traffic cyclic variation curve has been obtained, and will determine predicted traffic corresponding to the target moment according to the curve if a traffic cyclic variation curve has been obtained. If otherwise, other units in the DDoS attack detection device will be triggered to obtain the network traffic Si at n moments within a second period prior to the first period, where i=1, 2, . . . n, and n is a natural number, and to perform calculations according to equation $TE_i = \alpha S_{i-1} + (1-\alpha)TE_{i-1}$, so as to obtain the traffic cyclic variation curve $\{TE_i | i=1, 2, \ldots, n\}$, where, $\alpha$ is a predefined damping coefficient for smoothing in the range of $0 < \alpha < 1$, and $TE_i$ is the predicted traffic at an i-th moment within the first period. Thus the pre-acquired traffic cyclic variation curve is queried, and the predicted traffic at the target moment $t_{cur}$ is determined to be $TE_{cur}$, where $$cur = \left[ \frac{t_{cur} \% (G \times n)}{G} \right].$$

It has been verified that there is no DDoS attack in the second period.

It should be noted that the obtaining network traffic Si at n moments within the second period can be accomplished by sampling the traffics Si at n evenly or unevenly spaced moments, which will not be limited herein.

It should also be noted that the obtained traffic cyclic variation curve $\{TE_i | i=1, 2, \ldots, n\}$ is a set of discrete points for the present embodiment, and a continuous traffic cyclic variation curve may be further obtain by referring to any of the prior art curve fitting algorithms.

The detecting unit 33 is coupled to the determining unit 32, and is configured to detect the DDoS attack if the network traffic obtained by sampling is greater than the determined predicted traffic.

In particular, the detecting unit 33 determines whether the network traffic obtained by sampling is greater than the determined predicted traffic, and reports a DDoS attack if the network traffic obtained by sampling is greater than the determined predicted traffic, or reports normal network traffic if otherwise.

In this embodiment, network traffic at a target moment within a first period is obtained by sampling, before predicted traffic at the target moment is determined by querying a pre-acquired traffic cyclic variation curve. If the network traffic thus sampled is greater than the predicted traffic thus determined, a DDoS attack is detected. Since the traffic cyclic variation curve is used to indicate the cyclic change pattern of the predicted traffic, the predicted traffic corresponding to the target moment can be determined, before performing the DDoS attack detection at each target moment, by merely leveraging the traffic cyclic variation curve, rather than by calculating according to a huge amount of historical traffic data, thereby decreasing the amount of calculation involved. Moreover, leveraging historical traffic trends to detect DDoS also helps effectively finding out whether a sudden increase in traffic is attributable to expected traffics or DDoS attacks.

Figure 4:
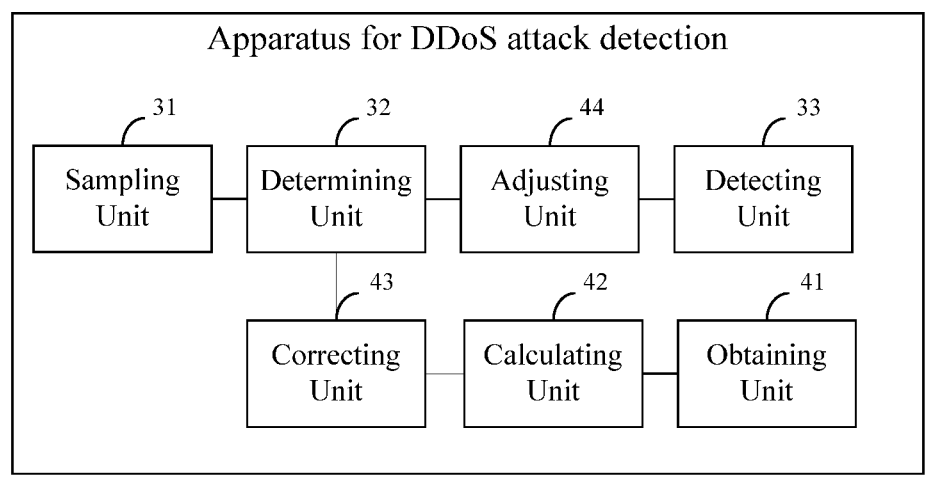
FIG. 4 is a schematic structural diagram illustrating an apparatus for DDoS attack detection according to another embodiment of the present disclosure.

FIG. 4 is a schematic structural diagram illustrating an apparatus for DDoS attack detection according to another embodiment of the present disclosure. On the basis of the previous embodiment, the apparatus in this embodiment further includes an obtaining unit 41, a calculating unit 42, and a correcting unit 43.

The obtaining unit 41 is configured to obtain network traffic Si at n moments within a second period prior to the first period, where i=1, 2, . . . n, n being a natural number.

The calculating unit 42 is coupled to the obtaining unit 41, and is configured to perform a calculation according to the equation $TE_i=\alpha S_{i-1}+(1-\alpha)TE_{i-1}$, so as to obtain a traffic cyclic variation curve $\{TE_i|i=1, 2, \ldots, n\}$.

In this case, $\alpha$ is a predefined damping coefficient for smoothing, which falls in the range of $0<\alpha<1$, and $TE_i$ is predicted traffic at an i-th moment.

The correcting unit 43 is coupled to the calculating unit 42 and the determining unit 32, and is configured to: perform a calculation according to equation $D_i=|\{S_i-TE_i\}|$ to obtain a residual error $D_i$ at the i-th moment; and correct the traffic cyclic variation curve according to equation $TH_i=TE_i+MAX(D_i)$ to obtain a corrected traffic cyclic variation curve $\{TH_i|i=1, 2, \ldots, n\}$.

In this case, $TH_i$ is a corrected predicted traffic at an i-th moment.

It should be understood that, potential error of sudden increase in the network traffic Si at the n moments within the second period is tested after the residual error $D_i$ at the i-th moment is obtained. That is, after performing the calculation according to equation $D_i=|\{S_i-TE_i\}$ and obtaining the residual error $D_i$ at the i-th moment, the correcting unit 43 can proceed to remove wild points, if any, from the residual errors $D_i$ according to the following procedure:

Firstly, a median $D_{med}=(D_{max}-D_{min})/2$ is determined, where $D_{max}$ represents the maximum residual error calculated, and $D_{min}$ represents the minimum residual error calculated.

Then, sequentially find out: the lower quartile $D_1=(D_{med}-D_{min})/2$;

the upper quartile $D_2=(D_{max}-D_{med})/2$; and the IQR $\Delta Q=D_2-D_1$.

Finally, a range $[D_1-1.5\Delta Q, D_2+1.5\Delta Q]$ is determined, and a residual error $D_i$ is a valid value that shall be kept if it falls within the range, or an invalid value that shall be removed if it falls outside of the range.

Alternatively, after the residual error $D_i$ at the i-th moment is obtained by calculation, the procedure may move on directly to correcting traffic cyclic variation curve according to the equation $TH_i=TE_i+MAX(D_i)$ without performing the aforementioned process for removing wild points.

Based on this, the determining unit 32 is particularly configured to determine the predicted traffic of the target moment $t_{cur}$ to be $TH_{cur}$, where $$cur = \left[\frac{t_{cur} \% (G \times n)}{G}\right].$$

Furthermore, the apparatus for DDoS attack detection further includes an adjusting unit 44.

The adjusting unit 44 is coupled to the determining unit 32, and is configured to: raise the determined predicted traffic if the first period is a traffic increasing period indicated by a predefined timing rule, and/or the target moment is a traffic increasing moment indicated by the timing rule; and/or lower the determined predicted traffic if the first period is a traffic decreasing period indicated by a predefined timing rule, and/or the target moment is a traffic decreasing moment indicated by the timing rule.

According to this embodiment, network traffic at a target moment within a first period is obtained by sampling, before predicted traffic at the target moment is determined by querying a pre-acquired traffic cyclic variation curve. If the network traffic thus sampled is greater than the predicted traffic thus determined, a DDoS attack is detected. Since the traffic cyclic variation curve is used to indicate the cyclic change pattern of the predicted traffic, the predicted traffic corresponding to the target moment can be determined, before performing the DDoS attack detection at each target moment, by merely leveraging the traffic cyclic variation curve, rather than by calculating according to a huge amount of historical traffic data, thereby decreasing the amount of calculation involved. Moreover, since the predicted traffic is adjusted based on the special timing rule, the cyclic change pattern of the predicted traffic can be further improved in terms of accuracy. Furthermore, leveraging historical traffic data can also help effectively finding out whether a sudden increase in traffic is attributable to expected traffics or DDoS attacks, thus reducing false alarms.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing embodiment methods are performed. The foregoing storage medium includes various mediums capable of storing program codes, such as a ROM, a RAM, a magnetic disk, or an optical disc.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A method for distributed denial of service (DDoS) attack detection, comprising:
   obtaining a network traffic at a target moment within a first period by sampling;
   determining a predicted traffic at the target moment within the first period by querying a traffic cyclic variation curve, wherein network traffic used for obtaining the traffic cyclic variation curve merely comes from one second period in which no DDoS attack has happened and the traffic cyclic variation curve indicates a cyclic change pattern of the predicted traffic, and wherein the second period is a period prior to the first period and an amount of moments included in the second period and a duration between two adjacent moments of the second period are respectively the same as those of the first period;
   determining that a DDoS attack exists when the network traffic at the target moment obtained by sampling is greater than the determined predicted traffic; and
   determining that no DDoS attack exists when the network traffic at the target moment obtained by sampling is less than or equal to the determined predicted traffic;
   wherein the traffic cyclic variation curve is obtained by:
   obtaining a network traffic Si at n moments within the second period prior to the first period, wherein i=1, 2, . . . n, n being a natural number; and
   performing a calculation according to equation $TE_i = \alpha S_{i-1}+(1-\alpha)TE_{i-1}$ to obtain the traffic cyclic variation curve $\{TE_i|i=1, 2, \ldots, n\}$, wherein $\alpha$ is a predefined damping coefficient for smoothing in a range of $0<\alpha<1$, and $TE_i$ is the predicted traffic at an i-th moment;

performing a calculation according to equation $D_i|\{S_i-TE_i\}|$ to obtain a residual error $D_i$ at the i-th moment;
removing a wild point from the residual errors; and
correcting the traffic cyclic variation curve according to equation $TH_i=TE_i+MAX(D_i)$ to obtain a corrected traffic cyclic variation curve $\{TH_i|i=1, 2, \ldots, n\}$, wherein $TH_i$ is a corrected predicted traffic at the i-th moment;
wherein the n moments within the second period are spaced by a duration G, and the determining predicted traffic at the target moment within the first period comprises:
determining that the predicted traffic $TH_{cur}$ at the target moment $t_{cur}$ corresponds to the predicted traffic $TH_j$ at the j-th moment in the second period, wherein $$j = \left\lceil \frac{t_{cur}\%(G \times n)}{G} \right\rceil;$$

wherein the removing a wild point from the residual errors comprises:
determining a median $D_{med}$ according to $D_{med}=(D_{max}-D_{min})/2$, wherein $D_{max}$ represents a maximum residual error calculated, and $D_{min}$ represents a minimum residual error calculated;
obtaining a lower quartile $D_1=(D_{med}-D_{min})/2$ an upper quartile $D_2=(D_{max}-D_{med})/2$, and an interquartile range (IQR) $\Delta Q=D_2-D_1$;
determining the residual error $D_i$ to be a wild point if it falls outside of the range of $[D_1-1.5\Delta Q, D_2+1.5\Delta Q]$; and
removing the wild point from the residual errors.

2. The method for DDoS attack detection according to claim 1, wherein, after the determining a predicted traffic at the target moment within the first period by querying a traffic cyclic variation curve, the method further comprises:
raising the determined predicted traffic when the first period is a traffic increasing period indicated by a predefined timing rule, and/or the target moment is a traffic increasing moment indicated by the timing rule; and
lowering the determined predicted traffic when the first period is a traffic decreasing period indicated by a predefined timing rule, and/or the target moment is a traffic decreasing moment indicated by the timing rule.

3. An apparatus for Distributed Denial of Service (DDoS) attack detection, comprising:
a sampling unit, configured to obtain a network traffic at a target moment within a first period by sampling;
a determining unit, configured to determine a predicted traffic at the target moment within the first period by querying a traffic cyclic variation curve, wherein network traffic used for obtaining the traffic cyclic variation curve merely comes from one second period in which no DDoS attack has happened and the traffic cyclic variation curve indicates a cyclic change pattern of the predicted traffic, and wherein the second period is a period prior to the first period and an amount of moments included in the second period and a duration between two adjacent moments of the second period are respectively the same as those of the first period;

a detecting unit, configured to determine the DDoS attack exists when the network traffic at the target moment obtained by sampling is greater than the determined predicted traffic; and
determine no DDoS attack exist when the network traffic at the target moment obtained by sampling is less than or equal to the determined predicted traffic;
wherein the apparatus further comprises:
an obtaining unit, configured to: obtain a network traffic $S_i$ at n moments within a second period prior to the first period, wherein i=1, 2, ... n, n being a natural number; and
a calculating unit, configured to perform a calculation according to equation $TE_i=\alpha S_{i-1}+(1-\alpha)TE_{i-1}$, to obtain the traffic cyclic variation curve $\{TE_i|i=1, 2, \ldots, n\}$, wherein $\alpha$ is a predefined damping coefficient for smoothing in a range of $0<\alpha<1$, and $TE_i$ is the predicted traffic at an i-th moment; and
a correcting unit, configured to perform a calculation according to equation $D_i=|\{S_i-TE_i\}|$ to obtain a residual error $D_i$ at the i-th moment, remove a wild point from the residual errors; and correct the traffic cyclic variation curve according to equation $TH_i=TE_i+MAX(D_i)$ to obtain a corrected traffic cyclic variation curve $\{TH_i|i=1,2, \ldots, n\}$, wherein $TH_i$ is a corrected predicted traffic at the i-th moment;
wherein the n moments within the second period are spaced by a duration of G, and
the determining unit is configured to determine that the predicted traffic $TH_{cur}$ at the target moment $t_{cur}$ corresponds to the predicted traffic $TH_j$ at the j-th moment in the second period, wherein $$j = \left\lceil \frac{t_{cur}\%(G \times n)}{G} \right\rceil;$$

wherein the correcting unit is further configured to:
determine a median $D_{med}$ according to $D_{med}=(D_{max}-D_{min})/2$, wherein $D_{max}$ represents a maximum residual error calculated, and $D_{min}$ represents a minimum residual error calculated;
obtain a lower quartile $D_1=(D_{med}-D_{min})/2$, an upper quartile $D_2=(D_{max}-D_{med})/2$, and an interquartile range (IQR) $\Delta Q=D_2-D_1$;
determine the residual error D, to be a wild point if it falls outside of the range of $[D_1-1.5\Delta Q, D_2+1.5\Delta Q]$; and
remove the wild point from the residual errors.

4. The apparatus for DDoS attack detection according to claim 3, further comprising:
an adjusting unit, configured to: raise the determined predicted traffic when the first period is a traffic increasing period indicated by a predefined timing rule, and/or the target moment is a traffic increasing moment indicated by the timing rule; and/or lower the determined predicted traffic when the first period is a traffic decreasing period indicated by a predefined timing rule, and/or the target moment is a traffic decreasing moment indicated by the timing rule.

* * * * *